(12) United States Patent
Dagrossa

(10) Patent No.: US 10,023,008 B2
(45) Date of Patent: Jul. 17, 2018

(54) TRACTION MAT

(71) Applicant: Darrin Dagrossa, Douglaston, NY (US)

(72) Inventor: Darrin Dagrossa, Douglaston, NY (US)

( * ) Notice: Subject to any disclaimer, the term of this patent is extended or adjusted under 35 U.S.C. 154(b) by 316 days.

(21) Appl. No.: 14/978,928

(22) Filed: Dec. 22, 2015

(65) Prior Publication Data

US 2017/0174000 A1   Jun. 22, 2017

(51) Int. Cl.
*B60B 39/12* (2006.01)
*E01C 9/00* (2006.01)
*E01C 15/00* (2006.01)

(52) U.S. Cl.
CPC .......... *B60B 39/12* (2013.01); *E01C 9/00* (2013.01); *E01C 15/00* (2013.01)

(58) Field of Classification Search
CPC ....................................................... B60B 39/12
USPC ............................................................ 238/14
See application file for complete search history.

(56) References Cited

U.S. PATENT DOCUMENTS

| 1,142,727 A | 6/1915 | Pottsgrove |
| 1,815,435 A | 7/1931 | Harding et al. |
| 1,863,316 A | 5/1932 | Meister, Jr. |
| 2,058,192 A * | 10/1936 | Turulis .................... B60B 39/12 152/213 R |
| 3,202,358 A | 8/1965 | Griswold |
| 3,291,393 A | 12/1966 | May |
| 3,672,422 A | 6/1972 | Greipel |
| 3,786,989 A | 1/1974 | Haynes |
| 3,861,592 A | 1/1975 | Fisher |
| 4,210,280 A | 7/1980 | Reisner |
| 4,211,366 A | 7/1980 | Czarnota |
| 4,300,722 A | 11/1981 | Simmons |
| 4,326,668 A | 4/1982 | Graymryd |
| 4,361,277 A | 11/1982 | Cannady et al. |
| 5,439,171 A | 8/1995 | Fruend |
| 5,833,136 A | 11/1998 | Japp |
| 5,921,570 A | 7/1999 | Lie |
| 6,394,362 B1 | 5/2002 | Kramr |
| 8,231,066 B2 * | 7/2012 | McCarthy ............... B60B 39/12 238/14 |
| 8,448,877 B1 * | 5/2013 | Aubin ..................... B60C 27/00 238/14 |
| 9,701,160 B2 * | 7/2017 | Dagrossa ................ B60B 39/12 |
| D797,032 S * | 9/2017 | Dagrossa .................... D12/400 |

(Continued)

FOREIGN PATENT DOCUMENTS

| FR | 2839455 A1 | 11/2003 |
| GB | 2087320 A | 5/1982 |
| WO | 2005042276 A1 | 5/2005 |

*Primary Examiner* — Zachary L Kuhfuss
(74) *Attorney, Agent, or Firm* — Richard L Miller

(57) ABSTRACT

A traction device that provides increased traction of a tire on a poor tractional surface. The traction device includes a base and a top cover. The base has a main portion, a pair of short side portions, and a plurality of traction blocks. The top cover is affixed to the base. The pair of short side portions of the base are serrated to facilitate engaging under the tire and are separate from the main portion of the base to increase flexibility of the top cover. The plurality of traction blocks of the base are affixed to the base and increase traction of the tire on the poor tractional surface when the poor traction surface is at least one of mud and snow.

58 Claims, 5 Drawing Sheets

(56) References Cited

U.S. PATENT DOCUMENTS

2014/0103131 A1    4/2014  Nutzati
2017/0100963 A1*  4/2017  Dagrossa ................ B60B 39/12

* cited by examiner

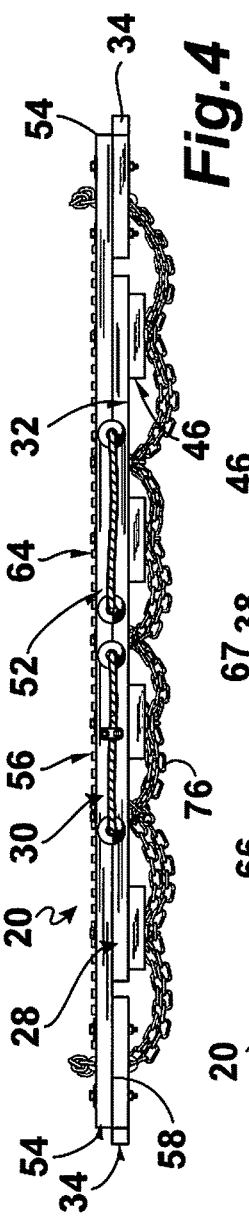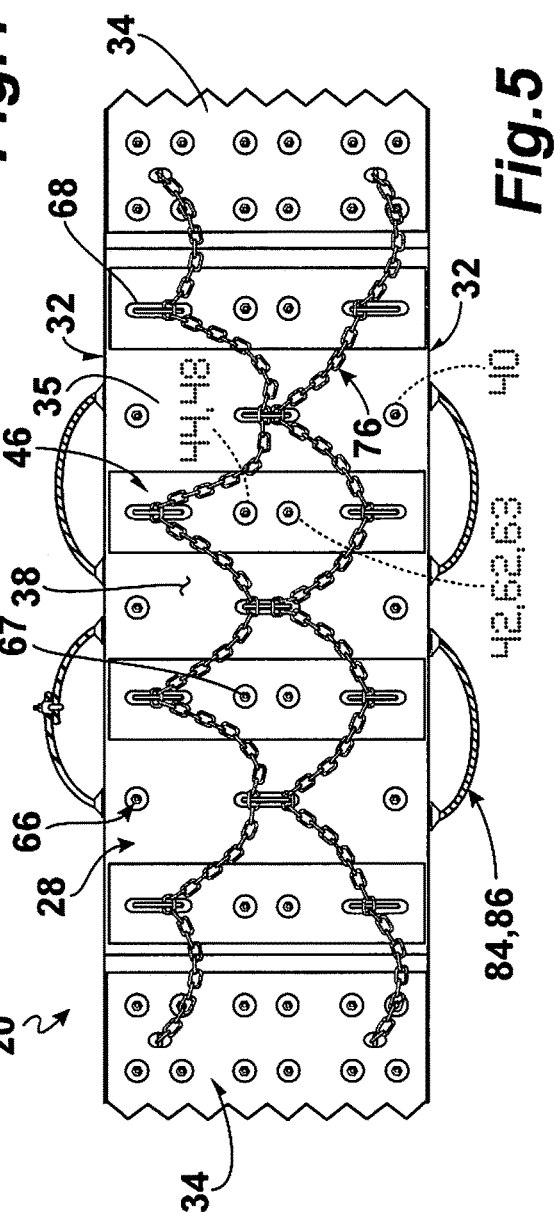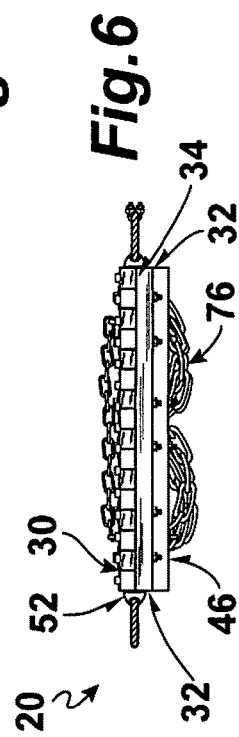

TRACTION MAT

BACKGROUND OF THE INVENTION

Field of the Invention

The present invention relates to a mat, and more particularly, a traction mat.

Description of the Prior Art

Numerous innovations for vehicle traction devices have been provided in the prior art that will be described. Even though these innovations may be suitable for the specific individual purposes to which they address, however, they differ from the present invention.

A FIRST EXAMPLE, U.S. Pat. No. 1,142,727, Published/Issued on Jun. 8, 1915, to Pottsgrove teaches a device that includes a webbing that has an entire length, a hem that is formed in one end of the webbing, and a chain that extends through the hem. The chain is attached to a tire of an automobile. Further included are reinforcing members that extend throughout the entire length of the webbing, metal binding straps are on the end of the webbing that is opposite to the hem, and chains are secured to the metal binding strips and secured to a stationary object whereby when the tire of the automobile is revolved, the device is wound upon the tire of the automobile and thereby causes the automobile to be moved.

A SECOND EXAMPLE, U.S. Pat. No. 1,815,435, Published/Issued on Jul. 21, 1931, to Harding, et al. teaches a traction tread device that includes a substantially imperforate body of vulcanized rubber that is placed between the tread of a driving wheel and the ground, and has projections on its underside to indent a soft or granular ground surface.

A THIRD EXAMPLE, U.S. Pat. No. 1,863,316, Published/Issued on Jun. 14, 1932, to Webster, Jr. teaches a traction mat that includes a sheet-metal shoe-portion that has a plurality of diagonally upwardly extending sharp projections. The sheet-metal shoe-portion is sufficiently pliable to conform to a shape of a vehicle tire. Further included are a strip of flexible material that has one of its ends secured to the sheet-metal shoe-portion, and a plurality of studs that are secured to the strip of flexible material, and which project from opposite sides thereof.

A FOURTH EXAMPLE, U.S. Pat. No. 3,291,393, Published/Issued on Dec. 13, 1966, to May teaches a traction mat to be interposed between a driving wheel of a vehicle and the ground. The mat includes a rectangular lattice-like strip that has a plurality of sections. Each section includes transversely spaced and parallel side links and inclined bars, ground-contacting edges and driving wheel contacting edges of the inclined bars are provided with serrations, upper and lower edges of the side links being provided with teeth with some of the teeth projecting beyond the serrations on the inclined bars. The side links extend longitudinally of the mat and having round ends. The inclined bars have parallel ends and define triangular-shaped pockets at the ends of the sections. Further included is a pivot apparatus that secures the rounded ends of the side links between the parallel ends of adjoining bars and applies a predetermined clamping pressure to the connected ends. The lattice-like strip is moldable into an irregular-shaped trough that is substantially conforming to the contour of a part of the driving wheel.

A FIFTH EXAMPLE, U.S. Pat. No. 3,672,422, Published/Issued on Jun. 27, 1972, to Greipel teaches a traction device for use with automotive vehicles to assist in extrication of the vehicle from ice, snow, sand, mud, or the like. The traction device includes a rigid or semi-rigid plate that has an upper traction surface for engagement by the vehicle tire, and projecting members on the opposite surface adapted to bite or dig into the ice, snow, mud, or sand in which the vehicle is stuck. Flexible apparatus, such as chains, secured to the traction plate are firmly secured to the traction mat to the vehicle tire at the interface with the material in which the vehicle is stuck. This causes the traction device to engage the tire temporarily, but firmly for sufficient time to permit the traction plate to become firmly set into engagement with the ice, snow, mud, or sand.

A SIXTH EXAMPLE, U.S. Pat. No. 3,786,989, Published/Issued on Jan. 22, 1974, to Haynes teaches a traction mat for placement beneath the driving wheel of an automobile disabled on an ice- or snow-covered road. The mat includes a one-piece, expendable, elongate, and flat sheet of expanded metal, such as, metal lath, and has a substantially rectangular shape and includes a plurality of slit portions formed by transverse slits in the metal. The sheet has a pair of opposite and longitudinal edge or margin portions formed by cutting across the sheet. This normally would result in a plurality of sharp protrusions that are formed by the cutting. To prevent injury to the user and damage to surrounding objects from scratching by the protrusions, a plastic substance is applied to the sharp protrusions, preferably, by dipping the latter into a bath of plastic in a molten state and allowing the plastic substance to solidify, whereby the protrusions become coated with beads or globules of plastic.

A SEVENTH EXAMPLE, U.S. Pat. No. 3,861,592, Published/Issued on Jan. 21, 1975, to Fisher teaches, a traction mat formed of injection molded thermoplastic material, and which has formed therein a plurality of integral sleeves that define socket-like recesses that extend transversely through the thickness of the material, being closed at one end and open at the other, and provided with metallic pins or studs that are frictionally secured in the sockets, and which project from the open end to engage a road bed.

AN EIGHTH EXAMPLE, U.S. Pat. No. 4,210,280, Published/Issued on Jul. 1, 1980, to Reisner teaches a traction mat that includes a plurality of pins that are captivated in a resilient mat. Each pin has a head on each of the opposing ends and a washer that is between the head and the mat. The mat seizes both the tire and the ground with the heads of each pin in pivotal action, as the washer pivots and locks the heads in a gripping position for the increased traction. A rigid steel start plate of a width less than the width of the tire is attached to one end of the mat for providing initial impetus to position the mat under the tire.

A NINTH EXAMPLE, U.S. Pat. No. 4,300,722, Published/Issued on Nov. 17, 1981, to Simmons teaches a traction mat to aid vehicle wheels for driving out of ice, snow, mud, sand, and the like, which is an elongated, unitary, and stamped metal structure that is generally rectangular and has a forward inwardly tapered end portion with the mat including a plurality of upwardly extending flanges disposed at 90° with respect to the planer surface and a plurality of downwardly projecting V-shaped gripping lugs. The mat outer side edges are formed with trough shaped ribs for stiffening and the upwardly extending flanges and downwardly shaped gripping lugs are provided with structurally formed ribbing to increase the rigidity for placement and use in a variety of terrains.

A TENTH EXAMPLE, U.S. Pat. No. 4,361,277, Published/Issued on Nov. 30, 1982, to Cannady, et al. teaches a traction device for assisting vehicles when stuck in sand, snow, bog, or the like, which incorporates a rigid plate having opposed upper and lower gripping ribs and an appended chain structure having transverse angle iron pieces spaced lengthwise thereof.

AN ELEVENTH EXAMPLE, U.S. Pat. No. 5,439,171, Published/Issued on Aug. 8, 1995, to Fruend teaches a traction mat for vehicles has panels of flexible resilient material interconnected by sets of overlapping links which enable the panels to be folded in a stacked arrangement. Recesses or slots in the upper faces of the panels provide grip for a vehicle's tires and holes in the panel enable the panel to be pushed down through mud to a solid surface.

It is apparent now that numerous innovations for vehicle traction devices have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a traction mat that avoids the disadvantages of the prior art.

ANOTHER OBJECT of the present invention is to provide a traction mat that is simple and inexpensive to manufacture.

STILL ANOTHER OBJECT of the present invention is to provide a traction mat that is simple to use.

BRIEFLY STATED, STILL YET ANOTHER OBJECT of the present invention is to provide a traction device that provides increased traction of a tire on a poor tractional surface. The traction device includes a base and a top cover. The base has a main portion, a pair of short side portions, and a plurality of traction blocks. The top cover is affixed to the base. The pair of short side portions of the base are serrated to facilitate engaging under the tire and are separate from the main portion of the base to increase flexibility of the top cover. The plurality of traction blocks of the base are affixed to the base and increase traction of the tire on the poor tractional surface when the poor traction surface is at least one of mud and snow.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 4 is a side elevational view thereof taken in the direction of arrow 4 in FIG. 2, the opposite side being substantially a mirror image thereof;

FIG. 5 is a bottom plan view thereof taken in the direction of arrow 5 in FIG. 2;

FIG. 6 is an end elevational view thereof taken in the direction of arrow 6 in FIG. 2, the opposite end being substantially a mirror image thereof.

A MARSHALING OF REFERENCE NUMERALS UTILIZED IN THE DRAWING

Introductory

Figure 1:
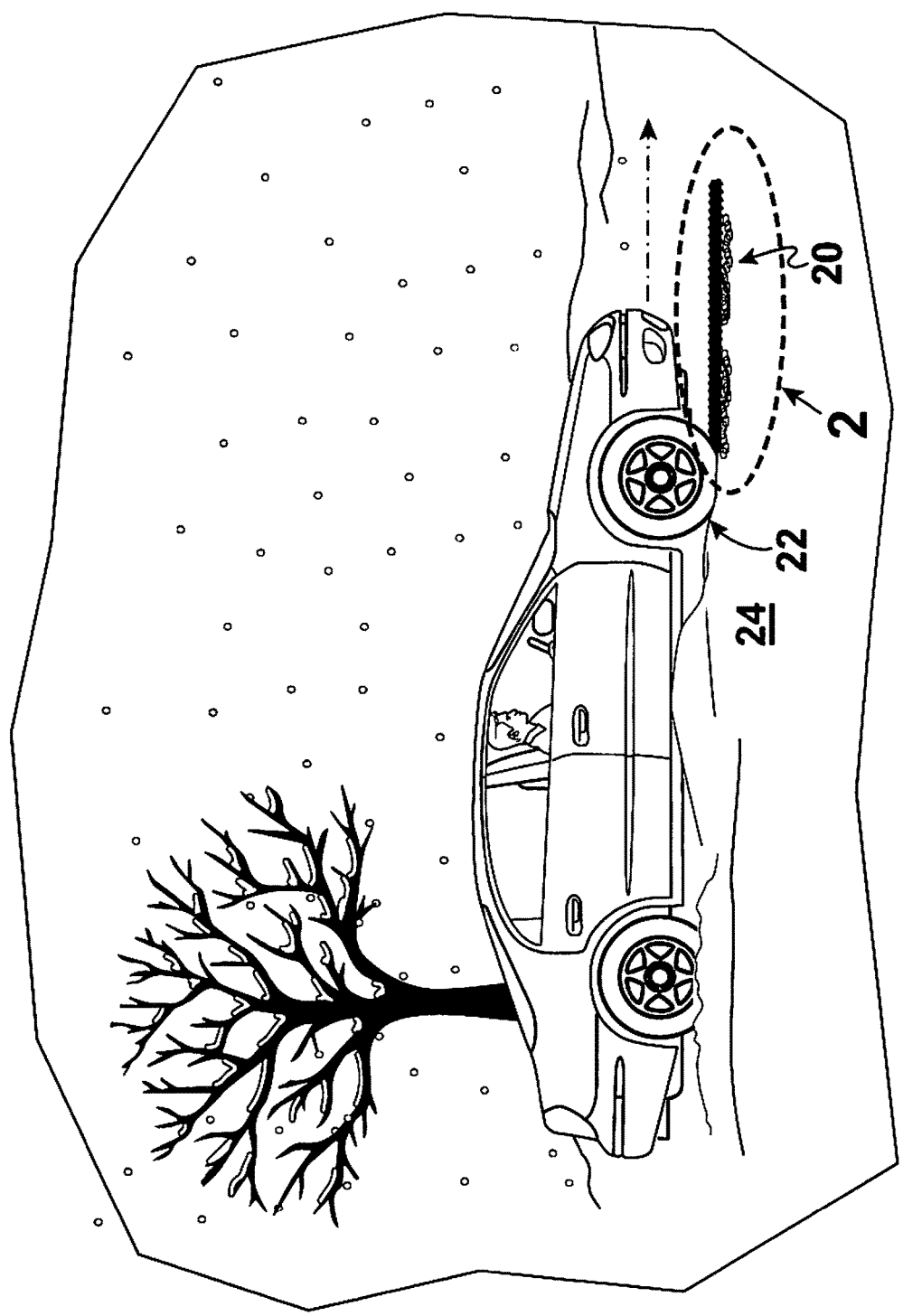
FIG. 1 is a diagrammatic perspective view illustrating the traction mat in use.
Figure 2:
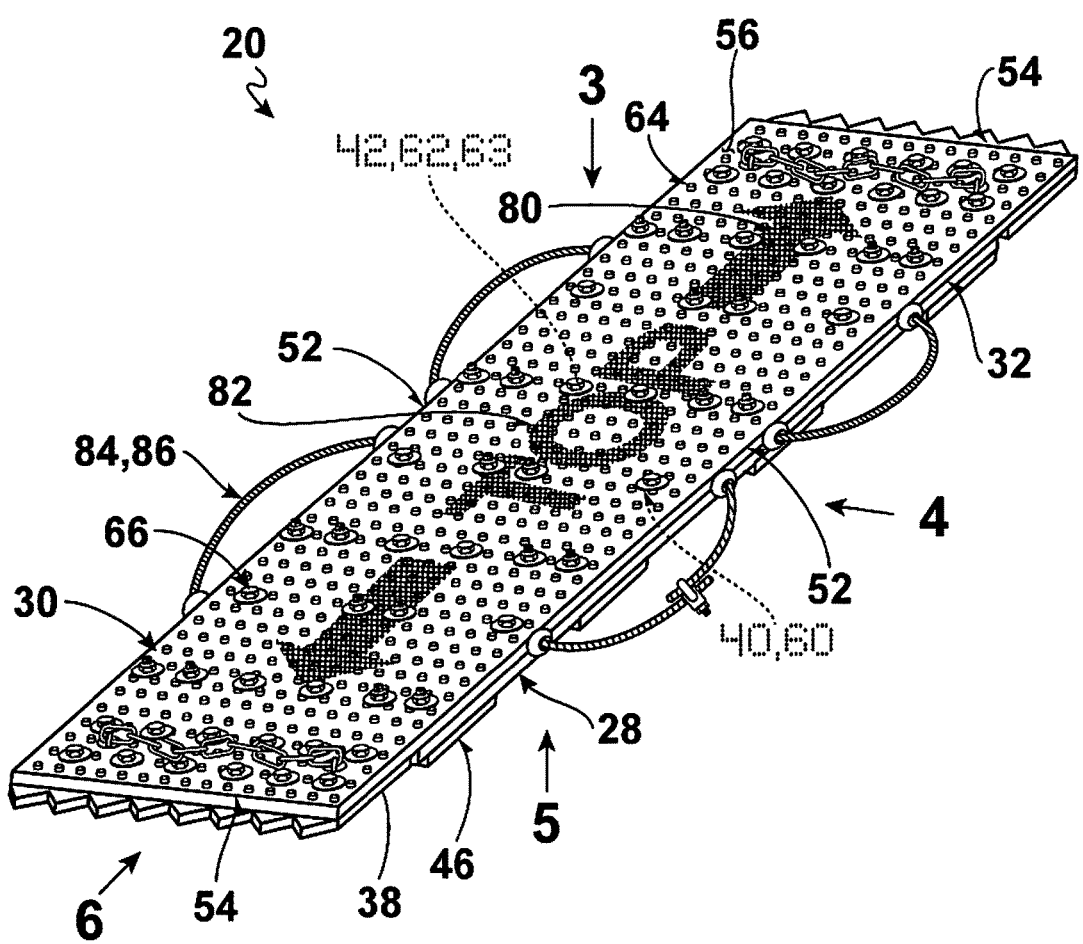
FIG. 2 is an enlarged diagrammatic perspective view of the traction mat per se.
Figure 3:
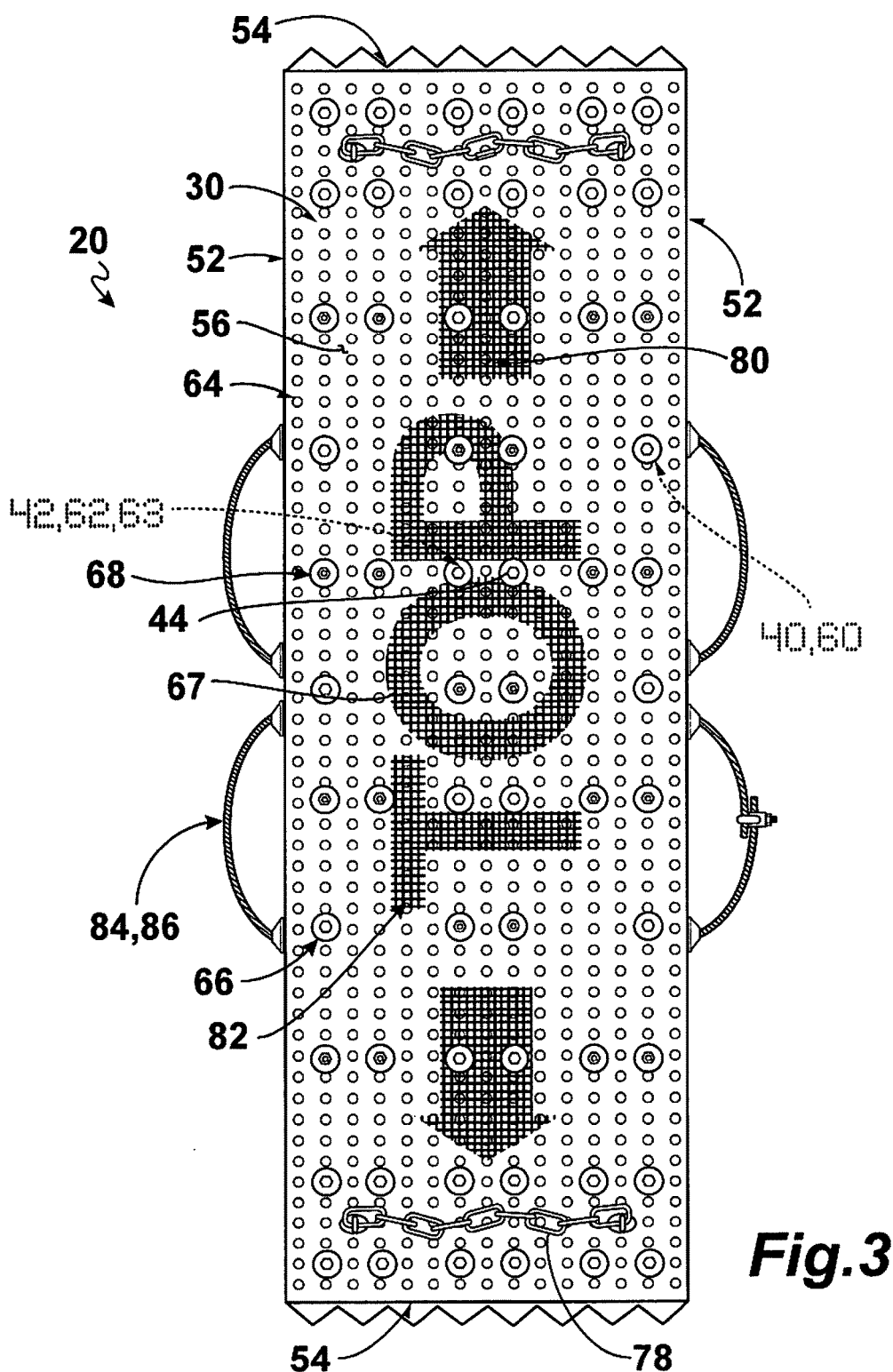
FIG. 3 is a top plan view thereof taken in the direction of arrow 3 in FIG. 2.
Figure 7:
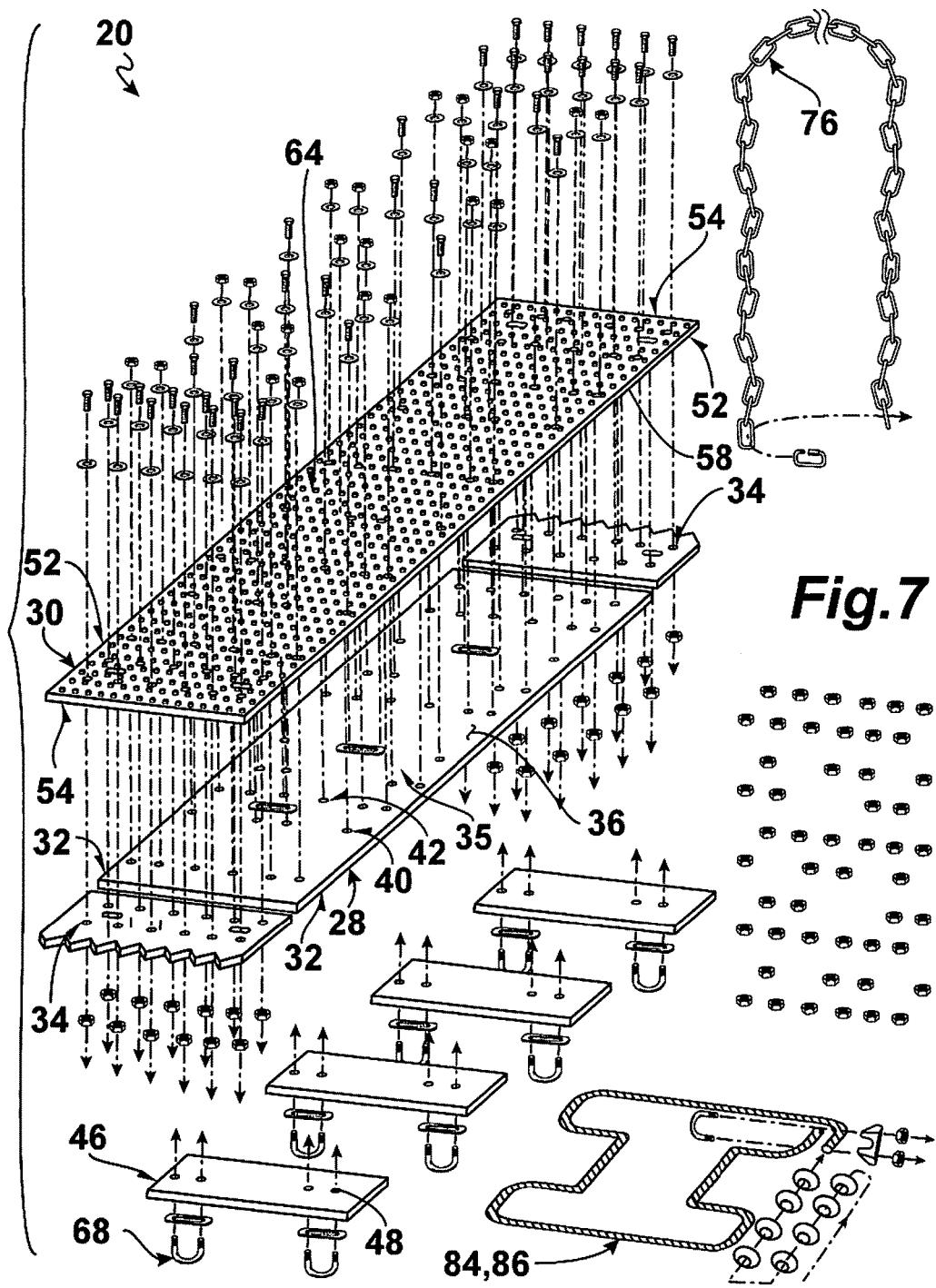
FIG. 7 is an exploded diagrammatic perspective view of the traction mat per se, with the arrow and the word on top omitted for clarity, showing all its components separated from each other.

20 traction device of embodiments of present invention for providing increased traction of tire 22 on poor tractional surface 24
22 tire
24 poor tractional surface

Overall Configuration of Traction Device 20

28 base
30 top cover

Specific Configuration of Base 28

32 pair of long sides of base 28
34 pair of short side portions of base 28
35 main portion of base 28
36 upper surface of base 28
38 lower surface of base 28
40 plurality of two layer through bores of base 28
42 plurality of three layer through bores of base 28
44 pairs of plurality of three layer through bores 42 of base 28
46 plurality of traction blocks of base 28 for increased traction of tire 22 on poor tractional surface 24 when poor traction surface 24 is at least one of mud and snow
48 pairs of through bores of plurality of traction blocks 46 of base 28

Specific Configuration of Top Cover 30

52 pair of long sides of top cover 30
54 pair of short sides of top cover 30
56 outer surface of top cover 30
58 inner surface of top cover 30
60 plurality of two layer through bores of top cover 30
62 plurality of three layer through bores of top cover 30
63 pairs of plurality of three layer through bores 62 of top cover 30
64 nubs of top cover 30 for increased traction of tire 22 on poor tractional surface 24
66 plurality of two layer nuts and bolts for further providing increased traction of tire 22 on poor tractional surface 24 when poor traction surface 24 is ice
67 plurality of three layer nuts and bolts
68 plurality of U-bolts and nuts for further providing increased traction of tire 22 on poor tractional surface 24 when poor tractional surface 24 is ice

Miscellaneous

76 endless chain for increased traction of tire 22 on poor tractional surface 24 when poor tractional surface 24 is ice
78 pair of handles of endless chain 76 for facilitating carrying traction device 20
80 pair of arrow indica for utilitarian purpose of alerting user that either of pair of short sides 54 of top cover 30 of traction device 20 is to be placed under tire 22

82 top indica for utilitarian purpose of alerting user which surface of traction device 20 is to be placed upwardly
84 wire
86 two pair of handles of wire 84 for further facilitating carrying the traction device 20

DETAILED DESCRIPTION OF THE PREFERRED EMBODIMENT

Introductory

Referring now to the figures, in which like numerals indicate like parts, and particularly to FIG. 1, the traction device of the embodiments of the present invention is shown generally at 20 for providing increased traction of a tire 22 on a poor tractional surface 24.

Overall Configuration of the Traction Device 20

The overall configuration of the traction device 20 can best be seen in FIGS. 2-7, and as such, will be discussed with reference thereto.

The traction device 20 comprises a base 28 and a top cover 30. The top cover 30 is affixed to the base 28.

Specific Configuration of the Base 28

The base 28 is made of a flexible material, and is rectangular-shaped, and as such, has a pair of long sides 32, a pair of short side portions 34, and a main portion 35.

The pair of short side portions 34 of the base 28 are serrated for facilitating engaging under the tire 22 and are separate from the main portion 35 of the base 28 for increased flexibility of the top cover 30.

The base 28 further has an upper surface 36, a lower surface 38, a plurality of two layer through bores 40, and a plurality of three layer through bores 42.

The plurality of two layer through bores 40 of the base 28 are spaced-apart from each other, extend axially therealong, and are disposed just inward of the pair of long sides 32 of the base 28.

The plurality of three layer through bores 42 of the base 28 are formed into pairs 44.

The pairs 44 of the plurality of three layer through bores 42 of the base 28 are axially spaced-apart from each other, extend laterally therealong, and are disposed between the plurality of two layer through bores 40 of the base 28.

The base 28 further has a plurality of traction blocks 46.

The plurality of traction blocks 46 of the base 28 are made of a flexible material, are axially spaced-apart from each other, extend laterally therealong, are disposed on the lower surface 38 of the base 28, under the pairs 44 of the plurality of three layer through bores 42 of the base 28, respectively, and are for the increased traction of the tire 22 on the poor tractional surface 24 when the poor traction surface 24 is at least one of mud and snow.

The plurality of traction blocks 46 of the base 28 have pairs of through bores 48, respectively.

The pairs of through bores 48 of the plurality of traction blocks 46 of the base 28 align with the pairs 44 of the plurality of three layer through bores 42 of the base 28, respectively.

Specific Configuration of the Top Cover 30

The top cover 30 is made of a flexible material, and is rectangular-shaped, and as such, has a pair of long sides 52 and a pair of short sides 54.

The top cover 30 further has an outer surface 56, an inner surface 58, a plurality of two layer through bores 60, and a plurality of three layer through bores 62.

The plurality of two layer through bores 60 of the top cover 30 are spaced-apart from each other, extend axially there along, and are disposed just inward of the pair of long sides 52 of the top cover 30.

The plurality of three layer through bores 62 of the top cover 30 are spaced-apart from each other, and are disposed inwardly of the plurality of two layer through bores 60 of, and throughout, the top cover 30.

The plurality of three layer through bores 62 of the top cover 30 are formed into pairs 63.

The pairs 63 of the plurality of three layer through bores 62 of the top cover 30 are axially spaced-apart from each other, extend laterally therealong, and are disposed between the plurality of two layer through bores 60 of the top cover 30.

The top cover 30 further has nubs 64.

The nubs 64 of the top cover 30 extend from the outer surface 56 of the top cover 30 and are for the increased traction of the tire 22 on the poor tractional surface 24.

The plurality of three layer through bores 62 of the top cover 30, the plurality of three layer through bores 42 of the base 28, and the pairs of through bores 48 of the plurality of traction blocks 46 of the base 28 are aligned with each other, respectively, so as to form a plurality of aligned three layer through bores.

The plurality of two layer through bores 60 of the top cover 30 and the plurality of two layer through bores 40 of the base 28 are aligned with each other, respectively, so as to form a plurality of aligned two layer through bores.

The traction device 20 further comprises a plurality of two layer nuts and bolts 66.

The bolts of the plurality of two layer nuts and bolts 66 pass, from the outer surface 56 of the top cover 30, through the plurality of aligned two layer through bores, where nuts of the plurality of two layer nuts and bolts 66 engage the bolts of the plurality of two layer nuts and bolts 66 to affix the top cover 30 to the base 28, with the serrations of the pair of short side portions 34 of the base 28 extending past the short sides 54 of the top cover 30, respectively, and with the bolts of the plurality of two layer nuts and bolts 66 being for further providing the increased traction of the tire 22 on the poor tractional surface 24 when the poor traction surface 24 is ice.

The traction device 20 further comprises a plurality of three layer nuts and bolts 67.

The bolts of the plurality of three layer nuts and bolts 67 pass through central pairs of the plurality of aligned three layer through bores, where nuts of the plurality of three layer nuts and bolts 67 engage the bolts of the plurality of three layer nuts and bolts 67 to affix the plurality of traction blocks 46 of the base 28, the base 28, and the top cover 30 together.

The traction device 20 further comprises a plurality of U-bolts and nuts 68. The U-bolts of the plurality of U-bolts and nuts 68 are for further providing the increased traction of the tire 22 on the poor tractional surface 24 when the poor tractional surface 24 is ice.

The U-bolts of the plurality of U-bolts and nuts 68 extend upwardly through outboard pairs of the plurality of aligned three layer through bores, where nuts of the plurality of U-bolts and nuts 68 engage the U-bolts of the plurality of U-bolts and nuts 68 to further affix the plurality of traction blocks 46 of the base 28, the base 28, and the top cover 30 together.

The U-bolts of the plurality of U-bolts and nuts 68 also extend upwardly through central pairs of the plurality of aligned two layer through bores to further affix the base 28 and the top cover 30 together.

Miscellaneous

The traction device 20 further comprises an endless chain 76.

The endless chain 76 extends continuously and diagonally through the plurality of U-bolts 68, from under the base 28, for the increased traction of the tire 22 on the poor tractional surface 24 when the poor tractional surface 24 is ice, and then continuously upwardly through outboard pairs of the plurality of aligned two layer through bores that are located through the pair of short side portions 34 of the base 28 so as to form a pair of handles 78, respectively, for facilitating carrying the traction device 20.

The traction device 20 further comprises a pair of arrow indica 80.

The pair of arrow indica 80 are associated with the top cover 30 point to the pair of short sides 54 of the top cover 30, respectively, for the utilitarian purpose of alerting a user that either of the pair of short sides 54 of the top cover 30 of the traction device 20 is to be placed under the tire 22.[1]

[1] See In re Miller, 164 USPQ 46, 49 (CCPA 1969)("When the printed matter is associated with a structural article for some utilitarian purpose, the fact that printed matter by itself is not patentable subject matter, because nonstatutory, is no reason for ignoring it when the claim is directed to a combination." [Emphasis added]); and In re Bernhart and Fetter, 163 USPQ 611 (CCPA 1969)("[E]ven though certain items are nonstatutory by themselves, it is proper to include them and rely on them for novelty and unobviousness if combined with other items which are in the statutory class [even though] the other 'items' may all be old."[Emphasis added]).

The traction device 20 further comprises top indica 82.

The top indica 82 is associated with the top cover 30 for the utilitarian purpose of alerting a user which surface of the traction device 20 is to be placed upwardly.[2]

[2] Id.

The traction device 20 further comprises a wire 84.

The wire 84 extends laterally outwardly from between the base 28 and the top cover 30 to form two pair of handles 86.

The two pair of handles 86 of the wire 84 extend from between the pair of long sides 52 of the top cover 30 and the pair of long sides 32 of the base 28, respectively, and are for further facilitating carrying the traction device 20.

Impressions

It will be understood that each of the elements described above, or two or more together, may also find a useful application in other types of constructions differing from the types described above.

While the invention has been illustrated and described as embodiments of a traction mat, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A traction device for providing increased traction of a tire on a poor tractional surface, comprising:

a) a base; and
b) a top cover;
wherein said top cover is affixed to said base;
wherein said base has a pair of long sides;
wherein said base has a pair of short side portions;
wherein said base has a lower surface;
wherein said base has a plurality of two layer through bores;
wherein said base has a plurality of three layer through bores;
wherein said plurality of three layer through bores of said base are formed into pairs;
wherein said base has a plurality of traction blocks;
wherein said plurality of traction blocks of said base are for the increased traction of the tire on the poor tractional surface when the poor traction surface is at least one of mud and snow;
wherein said plurality of traction blocks of said base have pairs of through bores, respectively;
wherein said top cover has a pair of long sides;
wherein said top cover has an outer surface;
wherein said top cover has a plurality of two layer through bores;
wherein said top cover has a plurality of three layer through bores;
wherein said plurality of three layer through bores of said top cover, said plurality of three layer through bores of said base, and said pairs of through bores of said plurality of traction blocks of said base are aligned with each other, respectively, so as to form a plurality of aligned three layer through bores;
wherein said plurality of two layer through bores of said top cover and said plurality of two layer through bores of said base are aligned with each other, respectively, so as to form a plurality of aligned two layer through bores;
further comprising a plurality of U-bolts and nuts; and
wherein said U-bolts of said plurality of U-bolts and nuts are for further providing the increased traction of the tire on the poor tractional surface when the poor tractional surface is ice.

2. The traction device of claim 1, wherein said base is made of a flexible material.

3. The traction device of claim 1, wherein said base is rectangular-shaped.

4. The traction device of claim 1, wherein said base has a main portion.

5. The traction device of claim 4, wherein said pair of short side portions of said base are separate from said main portion of said base for increased flexibility of said top cover.

6. The traction device of claim 1, wherein said pair of short side portions of said base are serrated for facilitating engaging under the tire.

7. The traction device of claim 6, wherein said top cover has a pair of short sides.

8. The traction device of claim 7, wherein said serrations of said pair of short side portions of said base extend past said pair of short sides of said top cover, respectively.

9. The traction device of claim 7, further comprising a pair of arrow indica; and wherein said pair of arrow indica point to said pair of short sides of said top cover, respectively, for the utilitarian purpose of alerting a user that either of said pair of short sides of said top cover of said traction device is to be placed under the tire.

10. The traction device of claim 9, wherein said pair of arrow indica are associated with said top cover.

11. The traction device of claim 1, wherein said base has an upper surface.

12. The traction device of claim 1, wherein said plurality of two layer through bores of said base are spaced-apart from each other.

13. The traction device of claim 1, wherein said plurality of two layer through bores of said base extend axially therealong.

14. The traction device of claim 1, wherein said plurality of two layer through bores of said base are disposed just inward of said pair of long sides of said base.

15. The traction device of claim 1, wherein said pairs of said plurality of three layer through bores of said base are axially spaced-apart from each other.

16. The traction device of claim 1, wherein said pairs of said plurality of three layer through bores of said base extend laterally therealong.

17. The traction device of claim 1, wherein said pairs of said plurality of three layer through bores of said base are disposed between said plurality of two layer through bores of said base.

18. The traction device of claim 1, wherein said plurality of traction blocks of said base are made of a flexible material.

19. The traction device of claim 1, wherein said plurality of traction blocks of said base are axially spaced-apart from each other.

20. The traction device of claim 1, wherein said plurality of traction blocks of said base extend laterally therealong.

21. The traction device of claim 1, wherein said plurality of traction blocks of said base are disposed on said lower surface of said base.

22. The traction device of claim 1, wherein said plurality of traction blocks of said base are disposed on said lower surface of said base under said pairs of said plurality of three layer through bores of said base, respectively.

23. The traction device of claim 1, wherein said pairs of through bores of said plurality of traction blocks of said base align with said pairs of said plurality of three layer through bores of said base, respectively.

24. The traction device of claim 1, wherein said top cover is made of a flexible material.

25. The traction device of claim 1, wherein said top cover is rectangular-shaped.

26. The traction device of claim 1, wherein said top cover has an inner surface.

27. The traction device of claim 1, wherein said plurality of two layer through bores of said top cover are spaced-apart from each other.

28. The traction device of claim 1, wherein said plurality of two layer through bores of said top cover extend axially therealong.

29. The traction device of claim 1, wherein said plurality of two layer through bores of said top cover are disposed just inward of said pair of long sides of said top cover.

30. The traction device of claim 1, wherein said plurality of three layer through bores of said top cover are spaced-apart from each other.

31. The traction device of claim 1, wherein said plurality of three layer through bores of said top cover are disposed inwardly of said plurality of two layer through bores of said top cover.

32. The traction device of claim 1, wherein said plurality of three layer through bores of said top cover are formed into pairs.

33. The traction device of claim 32, wherein said pairs of said plurality of three layer through bores of said top cover are axially spaced-apart from each other.

34. The traction device of claim 32, wherein said pairs of said plurality of three layer through bores of said top cover extend laterally therealong.

35. The traction device of claim 32, wherein said pairs of said plurality of three layer through bores of said top cover are disposed between said plurality of two layer through bores of said top cover.

36. The traction device of claim 1, wherein said top cover has nubs.

37. The traction device of claim 36, wherein said nubs of said top cover extend from said outer surface of said top cover; and
wherein said nubs of said top cover are for the increased traction of the tire on the poor tractional surface.

38. The traction device of claim 1, further comprising a plurality of two layer nuts and bolts; and
wherein said bolts of said plurality of two layer nuts and bolts are for further providing the increased traction of the tire on the poor tractional surface when the poor traction surface is ice.

39. The traction device of claim 38, wherein said bolts of said plurality of two layer nuts and bolts pass through said plurality of aligned two layer through bores.

40. The traction device of claim 39, wherein nuts of said plurality of two layer nuts and bolts engage said bolts of said plurality of two layer nuts and bolts when said bolts of said plurality of two layer nuts and bolts pass through said plurality of aligned two layer through bores.

41. The traction device of claim 39, wherein said bolts of said plurality of two layer nuts and bolts pass, from said outer surface of said top cover, through said plurality of aligned two layer through bores.

42. The traction device of claim 1, further comprising a plurality of three layer nuts and bolts.

43. The traction device of claim 42, wherein said bolts of said plurality of three layer nuts and bolts pass through central pairs of said plurality of aligned three layer through bores, where nuts of said plurality of three layer nuts and bolts engage said bolts of said plurality of three layer nuts and bolts to affix said plurality of traction blocks of said base, said base, and said top cover together.

44. The traction device of claim 1, wherein said U-bolts of said plurality of U-bolts and nuts extend upwardly through outboard pairs of said plurality of aligned three layer through bores, where nuts of said plurality of U-bolts and nuts engage said U-bolts of said plurality of U-bolts and nuts to affix said plurality of traction blocks of said base, said base, and said top cover together.

45. The traction device of claim 1, wherein said U-bolts of said plurality of U-bolts and nuts extend upwardly through central pairs of said plurality of aligned two layer through bores to affix said base and said top cover together.

46. The traction device of claim 1, further comprising an endless chain;
wherein said endless chain is for the increased traction of the tire on the poor tractional surface when the poor tractional surface is ice; and
wherein said endless chain is for facilitating carrying said traction device.

47. The traction device of claim 46, wherein said endless chain extends continuously through said plurality of U-bolts.

48. The traction device of claim 46, wherein said endless chain extends diagonally through said plurality of U-bolts.

49. The traction device of claim 46, wherein said endless chain extends from under said base.

50. The traction device of claim 46, wherein said endless chain extends through outboard pairs of said plurality of aligned two layer through bores.

51. The traction device of claim 50, wherein said outboard pairs of said plurality of aligned two layer through bores are disposed through said pair of short side portions of said base so as to form a pair of handles, respectively.

52. The traction device of claim 1, further comprising top indica; and
   wherein said top indica is for the utilitarian purpose of alerting a user which surface of said traction device is to be placed upwardly.

53. The traction device of claim 52, wherein said top indica is associated with said top cover.

54. The traction device of claim 1, further comprising a wire.

55. The traction device of claim 54, wherein said wire extends laterally from between said base and said top cover.

56. The traction device of claim 54, wherein said wire extends outwardly from between said base and said top cover.

57. The traction device of claim 54, wherein said wire forms two pair of handles; and
   wherein said two pair of handles of said wire are for facilitating carrying said traction device.

58. The traction device of claim 57, wherein said two pair of handles of said wire extend from between said pair of long sides of said top cover and said pair of long sides of said base, respectively.

* * * * *